United States Patent
Fisher et al.

(10) Patent No.: US 9,940,120 B2
(45) Date of Patent: *Apr. 10, 2018

(54) GENERATING AND CACHING SOFTWARE CODE

(71) Applicant: Microsoft Technology Licensing, LLC, Redmond, WA (US)

(72) Inventors: Jomo Fisher, Redmond, WA (US); Michael Wayne Jackson, Kirkland, WA (US); Yunus Kilic, Redmond, WA (US); Steven Edward Lucco, Bellevue, WA (US); Jesse D. McGatha, Sammamish, WA (US); Jedrzej Z. Miadowicz, Redmond, WA (US); Steven J. Steiner, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/801,488

(22) Filed: Jul. 16, 2015

(65) Prior Publication Data
US 2015/0324183 A1 Nov. 12, 2015

Related U.S. Application Data

(63) Continuation of application No. 13/371,479, filed on Feb. 13, 2012, now Pat. No. 9,110,751.

(51) Int. Cl.
*G06F 9/445* (2006.01)
*G06F 9/45* (2006.01)
*G06F 9/44* (2006.01)

(52) U.S. Cl.
CPC ............ *G06F 8/61* (2013.01); *G06F 8/41* (2013.01); *G06F 8/71* (2013.01)

(58) Field of Classification Search
CPC ............... G06F 8/41; G06F 8/71; G06F 8/61
(Continued)

(56) References Cited

U.S. PATENT DOCUMENTS 5,182,806 A * 1/1993 McKeeman ............ G06F 8/48
714/38.1
6,381,742 B2 4/2002 Forbes et al.
(Continued)

FOREIGN PATENT DOCUMENTS

| CN | 101226472 | 7/2008 |
|----|-----------|--------|
| JP | 2004528626 | 9/2004 |
| RU | 2358306 | 6/2009 |

OTHER PUBLICATIONS

Kazi et al. "Techniques for Obtaining High Performance in Java Programs", 2001.*
(Continued)

*Primary Examiner* — Viva Miller
(74) *Attorney, Agent, or Firm* — Dicke, Billig & Czaja, PLLC

(57) ABSTRACT

Aspects of the subject matter described herein relate to generating and caching software code. In aspects, a target device may receive software to install. The software may include source code that has not been compiled. The target device may install the software and indicate the source code of the package is to be compiled into intermediate or executable code that is persistently stored. If the target device receives a request to execute the software prior to it being compiled, the target device may compile and execute the software without delay. If the target device receives a request to execute the software after it is compiled, the target device may obtain and execute the compiled code. The behavior above may also be applied to scripting code obtained from a server remote to the target device.

2 Claims, 6 Drawing Sheets

(58) Field of Classification Search
USPC .................................................. 717/140, 174
See application file for complete search history.

(56) References Cited

U.S. PATENT DOCUMENTS

| | | | | |
|---|---|---|---|---|
| 6,715,134 | B2* | 3/2004 | Chang | G06F 17/5022 |
| | | | | 379/10.03 |
| 7,243,346 | B1* | 7/2007 | Seth | G06F 9/445 |
| | | | | 717/162 |
| 7,596,554 | B2 | 9/2009 | Da Palma et al. | |
| 8,046,779 | B2 | 10/2011 | Wusthoff et al. | |
| 9,110,751 | B2 | 8/2015 | Fisher et al. | |
| 2004/0034846 | A1 | 2/2004 | Ortal et al. | |
| 2004/0054994 | A1* | 3/2004 | Demsey | G06F 9/45516 |
| | | | | 717/148 |
| 2004/0123278 | A1* | 6/2004 | Nanja | G06F 9/45516 |
| | | | | 717/153 |
| 2004/0139309 | A1* | 7/2004 | Gentil | G06F 9/4451 |
| | | | | 713/1 |
| 2004/0168028 | A1* | 8/2004 | Cierniak | G06F 8/4434 |
| | | | | 711/125 |
| 2005/0010911 | A1 | 1/2005 | Kim et al. | |
| 2005/0055686 | A1* | 3/2005 | Buban | G06F 8/65 |
| | | | | 717/170 |
| 2005/0240732 | A1 | 10/2005 | Crick et al. | |
| 2006/0277250 | A1 | 12/2006 | Cherry et al. | |
| 2008/0010594 | A1 | 1/2008 | Hoerentrup et al. | |
| 2008/0104198 | A1* | 5/2008 | Kamath | G06F 17/30902 |
| | | | | 709/217 |
| 2008/0189350 | A1* | 8/2008 | Vasa | H04L 12/2602 |
| | | | | 709/201 |
| 2009/0100228 | A1* | 4/2009 | Lepeska | G06F 17/30902 |
| | | | | 711/125 |
| 2009/0125469 | A1* | 5/2009 | McDonald | G06N 5/025 |
| | | | | 706/47 |
| 2009/0150863 | A1* | 6/2009 | Guo | G06F 8/437 |
| | | | | 717/116 |
| 2010/0030891 | A1 | 2/2010 | Kim et al. | |
| 2010/0153929 | A1* | 6/2010 | Porras | G06F 8/71 |
| | | | | 717/139 |
| 2010/0299661 | A1* | 11/2010 | Citron | G06F 9/445 |
| | | | | 717/154 |
| 2011/0087966 | A1* | 4/2011 | Leviathan | G06F 17/30905 |
| | | | | 715/745 |
| 2011/0264861 | A1 | 10/2011 | Fee et al. | |
| 2012/0059869 | A1* | 3/2012 | Seo | G06F 17/30893 |
| | | | | 709/202 |
| 2012/0185833 | A1* | 7/2012 | Oh | G06F 9/4552 |
| | | | | 717/139 |
| 2012/0272132 | A1* | 10/2012 | Mondal | G06F 17/30899 |
| | | | | 715/234 |
| 2013/0212567 | A1 | 8/2013 | Fisher et al. | |

OTHER PUBLICATIONS

Kazi et al. "Techniques for Obtaining High Performance in Java Programs", ACM Computing Surveys, vol. 32, No. 3, Sep. 2000, pp. 213-240.*

Hickey, Rich, "Ahead-of-time Compilation and Class Generation", Retrieved at <<http://clojure.org/compilation>>, Retrieved Date: Dec. 27, 2011, pp. 5.

Sosnoski, Dennis, "Classworking toolkit: Combining source and bytecode generation", Retrieved at <<http://www.ibm.com/developerworks/java/library/j-cwt10045/index.html, Oct. 4, 2005, pp. 11.

Gal, et al., "Trace-based Just-in-Time Type Specialization for Dynamic Languages", Retrieved at <<http://citeseerx.ist.psu.edu/viewdoc/download?doi=10.1.1.148.349&rep=rep1&type=pdf>>, Proceedings of the 2009 ACM SIGPLAN conference on Programming language design and implementation, Jun. 15-20, 2009, pp. 465-478.

Kazi, et al. "Techniques for Obtaining High Performance in Java Programs", Retrieved at <<http://citeseerx.ist.psu.edu/viewdoc/download?doi=10.1.1.85.6545&rep=rep1&type=pdf>>, ACM Computing Surveys, vol. 32, No. 3, Sep. 2000, pp. 213-240.

Mehrara, et al. "Dynamically Accelerating Client-side Web Applications through Decoupled Execution", Retrieved at <<http://ieeexplore.ieee.org/stamp/stamp.jsp?tp=&arnumber=5764676>>, 9th Annual IEEE/ACM International Symposium on Code Generation and Optimization (CGO), Apr. 2-6, 2011, pp. 74-84.

Hsieh, et al. "Java Bytecode to Native Code Translation: The Caffeine Prototype and Preliminary Results", Retrieved at <<http://ieeexplore.ieee.org/stamp/stamp.jsp?tp=&arnumber=566453>>, Proceedings of the 29th Annual IEEE/ACM International Symposium on Microarchitecture, Dec. 2-4, 1996, pp. 90-97.

"International Search Report", Mailed Date: Apr. 25, 2013, Application No. PCT/US2013/024559, Filed Date: Feb. 4, 2013, pp. 9.

U.S. Appl. No. 13/371,479, Non-Final Rejection dated Dec. 27, 2013, 22 pages.

U.S. Appl. No. 13/371,479, Amendment dated May 12, 2014, 15 pages.

U.S. Appl. No. 13/371,479, Non-Final Rejection dated Sep. 23, 2014, 26 pages.

U.S. Appl. No. 13/371,479, Amendment dated Mar. 23, 2015, 13 pages.

U.S. Appl. No. 13/371,479, Notice of Allowance dated Apr. 10, 2015, 12 pages.

"International Preliminary Report on Patentability Issued in PCT Application No. PCT/US2013/024559", Mailed Date: Aug. 28, 2014, 6 Pages.

Bailey, Edward C., "Maximum RPM—Taking the Red Hat Package Manager to the Limit", Retrieved from <<http://www.redhat.com/docs/books/max-rpm/max-rpm.pdf>>, Feb. 29, 2000, 84 Pages.

* cited by examiner

| SOURCE CODE A | BYTE CODE A | SOURCE CODE B | BYTE CODE B | ... | SOURCE CODE N | BYTE CODE N |

GENERATING AND CACHING SOFTWARE CODE

CROSS-REFERENCE TO RELATED APPLICATIONS

This application claims priority to and is a continuation of co-pending U.S. patent application Ser. No. 13/371,479 entitled "Generating and Caching Software Code" and filed Feb. 13, 2012, which is incorporated herein by reference.

BACKGROUND

Scripting languages may be found in various environments. For example, many Internet browsers have a scripting language that allows a Web page to customize its behavior based on user input or other data. Scripting languages may also be found in environments outside of Internet browsers. One issue with scripting languages is that they can be slow—especially on startup and possibly with each execution—compared to conventional programs that have been compiled.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to generating and caching software code. In aspects, a target device may receive software to install. The software may include source code that has not been compiled. The target device may install the software and indicate the source code of the package is to be compiled into intermediate or executable code that is persistently stored. If the target device receives a request to execute the software prior to it being compiled, the target device may compile and execute the software without delay. If the target device receives a request to execute the software after it is compiled, the target device may obtain and execute the compiled code. The behavior above may also be applied to scripting code obtained from a server remote to the target device.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

BRIEF DESCRIPTION OF THE DRAWINGS

FIG. 3 illustrates an exemplary data structure that may be used in accordance with aspects of the subject matter described herein;

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrases "first version" and "second version" do not necessarily mean that the first version is the very first version or was created before the second version or even that the first version is requested or operated on before the second version. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
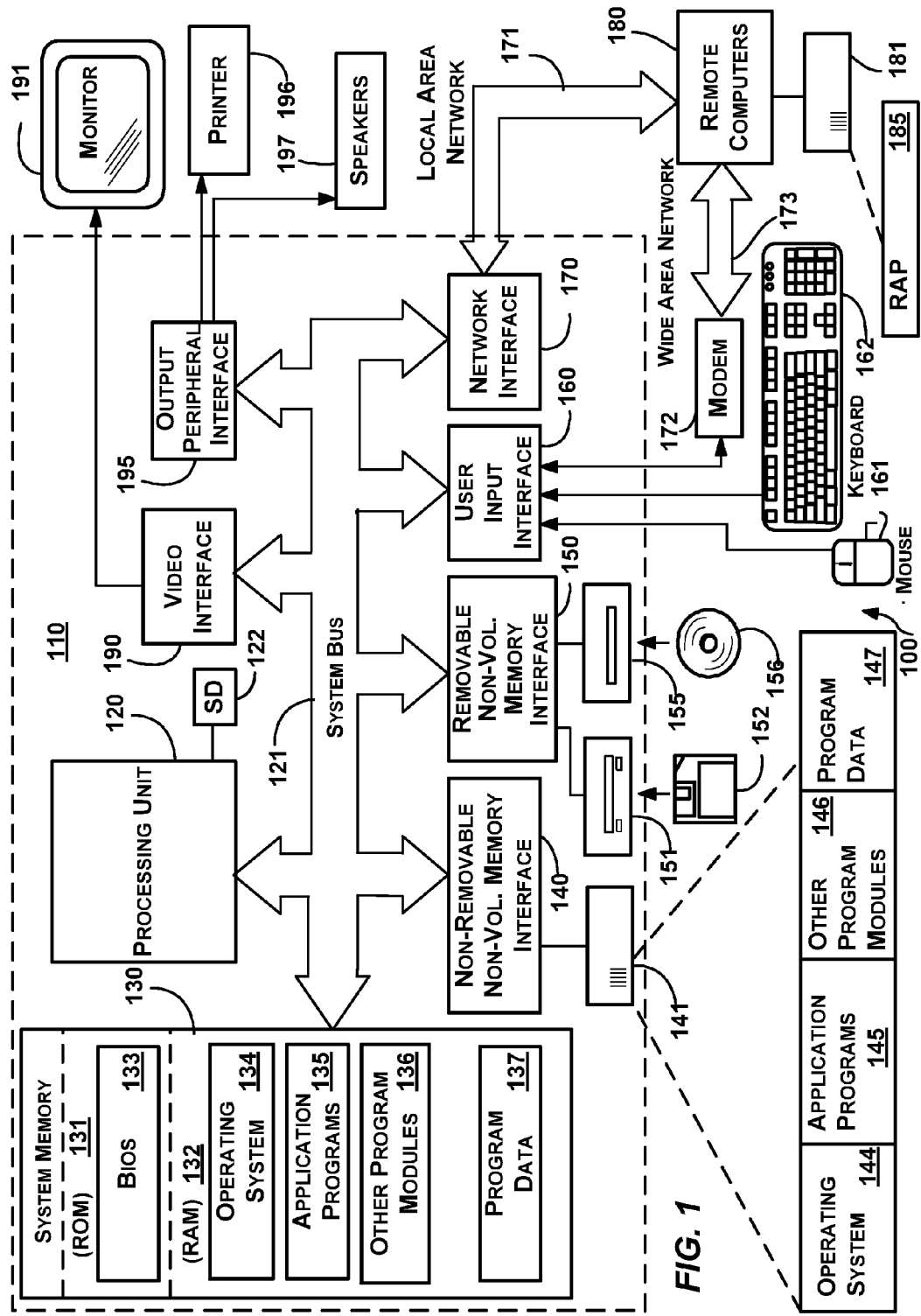
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The processing unit 120 may be connected to a hardware security device 122. The security device 122 may store and be able to generate cryptographic keys that may be used to secure various aspects of the computer 110. In one embodiment, the security device 122 may comprise a Trusted Platform Module (TPM) chip, TPM Security Device, or the like.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards and other solid state storage devices, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable nonvolatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, a gesture capturing device, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Generating and Caching Code

As mentioned previously, compared to a conventional program that has been compiled, a scripting language may appear to be slow to a user, especially on initial startup.

Figure 2:
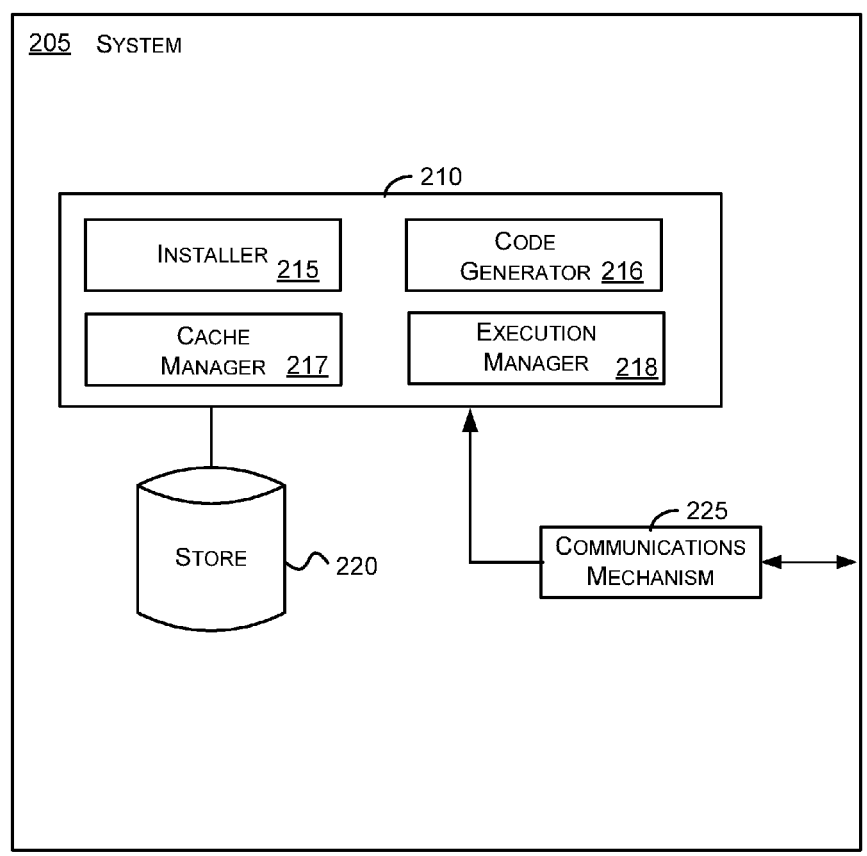
FIG. 2 is a block diagram representing an exemplary arrangement of components of a system in which aspects of the subject matter described herein may operate.

FIG. 2 is a block diagram representing an exemplary arrangement of components of a system in which aspects of the subject matter described herein may operate. The components illustrated in FIG. 2 are exemplary and are not meant to be all-inclusive of components that may be needed or included. In other embodiments, the components and/or functions described in conjunction with FIG. 2 may be included in other components (shown or not shown) or placed in subcomponents without departing from the spirit or scope of aspects of the subject matter described herein. In some embodiments, the components and/or functions described in conjunction with FIG. 2 may be distributed across multiple devices.

Turning to FIG. 2, the system 205 may include scripting components 210, a store 220, a communications mechanism 225, and other components (not shown). The system 205 may comprise one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like.

Where the system 205 comprises a single device, an exemplary device that may be configured to act as the system 205 comprises the computer 110 of FIG. 1. Where the system 205 comprises multiple devices, each of the multiple devices may comprise a similarly or differently configured computer 110 of FIG. 1.

The scripting components 210 may include an installer 215, a code generator 216, a cache manager 217, an execution manager 218, and other components (not shown). As used herein, the term component is to be read to include all or a portion of a device, a collection of one or more software modules or portions thereof, some combination of one or more software modules or portions thereof and one or more devices or portions thereof, and the like.

The communications mechanism 225 allows the system 205 to communicate with other entities. For example, the communications mechanism 225 may allow the system 205 to communicate with other entities to obtain packages and/or scripting code that may be cached on the system 205. The communications mechanism 255 may be a network interface or adapter 170, modem 172, or any other mechanism for establishing communications as described in conjunction with FIG. 1.

The store 220 is any storage media capable of providing access to data. Access as used herein may include reading data, writing data, deleting data, updating data, a combination including two or more of the above, and the like. The store may include volatile memory (e.g., RAM, an in-memory cache, or the like) and non-volatile memory (e.g., a persistent storage).

The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

The store 220 may comprise hard disk storage, other non-volatile storage, volatile memory such as RAM, other storage, some combination of the above, and the like and may be distributed across multiple devices. The store 220 may be external, internal, or include components that are both internal and external to the system 205.

To decrease startup and execution times, reduce memory footprint, to enable protection against tampering, and for other reasons, the code generator 216 may compile source code into bytecode or some other intermediate code or executable code. Code includes instructions that indicate actions a computer is to take. Code may also include data, resources, variables, definitions, relationships, associations, and the like that include information other than actions the computer is to take. For example, the code may include images, Web pages, HTML, XML, other content, and the like. In an embodiment, the code may be included in a software project. Software may include or reference one or more code portions, data, resources, variables, definitions, relationships, associations, and the like that include information other than actions the computer is to take, configuration information, and the like.

Actions indicated by code may be encoded in a source code language including scripting and non-scripting languages, intermediate language, assembly language, binary code, other language, some combination of the above, and the like.

The installer 215 may install packages on the system 205. A package may include one or more software applications. The installer 215 may include a deployment extension handler that allows for custom actions to be performed based on the package installed, the target machine upon which the package is installed, whether the package includes scripting code, or other criteria.

In one implementation, when the installer 215 encounters a package with scripting code therein, the installer 215 may add elements corresponding to the components of the package to a queue or other data structure for precompiling the code of the package.

The code generator 216 may take elements from the data structure and may generate bytecode, executable code, or some other code from the code corresponding to each of the elements. An element may include a file that includes script, a portion of a file (e.g, script embedded within an HTML page), compiled code, or the like. For simplicity, the term bytecode is often used herein to denote the code that the code generator 216 generates. It is to be understood, however, that the code generator 216 is not limited to generating and caching bytecode and may, in other implementations, generate and cache other types of code including those types of code that have been mentioned previously.

In one implementation, the code generator 216 may wait until a package has been completely installed and elements corresponding to the package placed in the data structure for compilation before generating bytecode. In another implementation, the code generator 216 may begin generating bytecode as soon as an element is available in the data structure or as soon as a source code module is installed. In this other implementation, in one example, the code generator 216 may dispose of the generated bytecode if the package installation fails. In another example, the code generator 216 may resume the generation from the point it left off (e.g., after power is restored and the machine is rebooted.) In one implementation, the code generator 216 may be implemented as a process to perform when the system 205 is idle (e.g., not installing packages or performing other tasks that consume the processing bandwidth of the system 205), when the system 205 is operating on line power (e.g., instead of battery power), at defined or configurable times of the day, or the like.

The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device.

In one implementation, the code generator 216 may also be used to generate code on the fly (e.g., as the code is encountered). For example, if a user installs software and wants to run the software before the bytecode for the entire package that includes the software is generated, the code generator 216 may be employed to generate code for the software as needed. In other words, the user is not required to wait for the code generator 216 to generate bytecode for the entire package before the user is allowed to execute software of the package. In addition, there may be other situations in which the source code for a component has changed and where the code generator 216 may be employed to generate bytecode for the component on an expedited basis.

Furthermore, the code generator 216 may be employed on-demand to compile code and cache code. For example, in an Internet browser application, links to new code may be discovered dynamically. For example, a Web document may include links to other code that is to be downloaded and executed. The code generator 216 may be employed to compile the code referred to by these links and cache the compiled code to speed subsequent executions of the code.

The code generator 216 may be implemented in or use a "sand box" to generate code. A sand box is an environment that has limited rights with respect to data it can access. In one implementation, the code generator 216 may be implemented as a process with restricted rights. The process may be passed a handle to a bytecode file that the process can read from and write to and may be given read-only access to the source code. For security purposes, the process may not have access to other resources than those mentioned above.

In one implementation, the code generator 216 may be hosted in a virtual environment. A virtual environment is an environment that is simulated or emulated by a computer. The virtual environment may simulate or emulate a physical machine, operating system, set of one or more interfaces, portions of the above, combinations of the above, or the like. When a machine is simulated or emulated, the machine is sometimes called a virtual machine. A virtual machine is a machine that, to software executing on the virtual machine, appears to be a physical machine. The software may save files in a virtual storage device such as virtual hard drive, virtual floppy disk, and the like, may read files from a virtual CD, may communicate via a virtual network adapter, and so forth.

A virtual environment may have restricted or no access to data or other resources outside of the virtual environment. As such, a virtual environment may provide a suitable environment for compiling untrusted code without worrying about whether the code will infect the host of the virtual environment.

After writing the bytecode to a file, the process may electronically sign or otherwise "seal" the file so that any modifications to the file are detectable. Sealing the file may take many cryptographic and/or file system forms that will be understood by those skilled in the art. For example, in one implementation, a file system may set an extended attribute on a file upon sealing. If the file is modified thereafter, the extended attribute may be changed to indicate that the file is no longer sealed.

Writing the bytecode to the store 220 is sometimes referred to herein as caching the bytecode. The cache manager 217 may operate to store the bytecode on the store 220 and provide access to the bytecode upon demand. The cache manager 217 may ensure that the bytecode is persistently stored on the store 220 such that the bytecode is available after a restart of the system 205. The cache manager 217 may also store a copy of the bytecode in main memory, high speed cache memory, video memory, other memory including volatile and nonvolatile memory, or the like, if desired, to speed access to the bytecode.

Furthermore, although the term file is sometimes used herein, it is to be understood that in other implementations the bytecode may be written to volatile and/or non-volatile memory, a database or portion thereof (e.g., a record), or some other store without departing from the spirit or scope of aspects of the subject matter described herein.

If more than one user installs a package, an implementation may cache multiple copies or only one copy of the bytecode for the package in the store 220. Where a package targets more than one processor architecture (e.g., 32 bit and 64 bit), the code generator 216 may generate and cache targeted bytecode for each processor architecture.

In some implementations, there may be several triggers for regenerating the bytecode of a package. For example, if the seal of a file that includes the bytecode has been broken (e.g. tampering is detected), storage media has become corrupted, or other data indicates that the cache may be invalid or not intact, this may serve as a trigger that the bytecode of the package is to be regenerated. In this case, if the execution manager 218 determines that the seal has been broken, the execution manager 218 may instruct the code generator 216 to regenerate the bytecode for the package. The code generator 216 may regenerate the bytecode in a manner similar to how the code generator 216 first generated the bytecode (e.g., by placing elements corresponding to the components of a package in a queue or other data structure indicating a need for generating the bytecode).

As another example, if the environment using the bytecode has been upgraded to a new version, this may trigger regenerating the bytecode. For example, if an Internet browser or another execution environment has been updated to a new version that has a different bytecode grammar or syntax, this may trigger regenerating bytecode suitable for the new version. In this example, the trigger may occur when a user attempts to execute the software associated with the bytecode. This may cause the bytecode to be regenerated upon use and may avoid regenerating bytecode for all installed packages at once.

As another example, if a periodic maintenance task detects that the execution environment has been updated to a new eversion that has a different bytecode grammar or syntax, this may trigger regenerating bytecode suitable for the new version.

As another example, if a new version of the package is to be installed, this may serve as a trigger for regenerating the bytecode.

As another example, if the bytecode is deleted for some reason, this may serve as a trigger for regenerating the bytecode.

In the store 220, the source code and corresponding bytecode may be stored, in one example, as illustrated in FIG. 3. FIG. 3 illustrates an exemplary data structure that may be used in accordance with aspects of the subject matter described herein. In one implementation, the data structure illustrated in FIG. 3 may have a table that indicates the source code files and bytecode representations that are available in the data structure. The table may also include data that indicates where the source code files and the bytecode representations are located in the data structure. The data structure may be stored in or represented as a file, in a database, or in another store without departing from the spirit or scope of aspects of the subject matter described herein.

Turning to FIG. 3, the data structure 305 may have source code and corresponding bytecode collocated. If the store 220 is implemented as a file system, the data structure 305 may improve efficiency of obtaining data as it may reduce the number of file handles or the like needed to access the bytecode. Where the source code resides in a package as opposed to one or more Web pages or the like, collocating the source code and the corresponding bytecode may be the default behavior. This default behavior may be overridden, if desired.

In another implementation, where the store 220 is implemented as a file system, there may be a separate bytecode file for each of one or more components of a package. Although this may be less efficient in some scenarios, it may have other advantages and uses. This implementation may be used, for example, when the source code may reside externally to a package (e.g., at one or more Web sites) and/or when the source code may be generated dynamically.

As another example, this may be used where there are naturally isolated experiences where the host or user may want to purge all information associated with a single website.

As another example, this may be used in scenarios in which a browser is pre-informed of the resources on a given website. In this example, a browser may pre-fetch the resources of the website so that the website may be used even when there is no network connection. In this example, bytecode may be generated even for pages deeper in the website despite not having encountered an explicit reference to script files for the pages in the HTML markup.

Determining whether to look for the source code and corresponding bytecode in a single file or to look for a separate file for each source code/bytecode pair, may be based on the environment which is executing the package. If the environment is a Web browser, the cache manager may look for a separate file for bytecode corresponding to each source code component. If the environment is an application framework or another environment (e.g., the pre-informed website example described above) where all the source code components are known in advance because they come from a package, the cache manager may look for the bytecode for the entire package to be collocated in a single file.

Not every source code component of a package may have corresponding bytecode in the data structure 305. For example, for various reasons it may be desirable not to create bytecode for one or more components of a package. In such cases, the source code and bytecode for the component(s) may be omitted from the data structure 305.

In addition, the data structure 305 may be memory mapped for sharing between two or more packages. For example, in some cases, different packages may have one or more identical source components. In these cases, memory mapping may be utilized to share the bytecode for the identical source components so that there is no need for multiple copies of the bytecode in memory. Furthermore, the bytecode in the data structure 305 may be read-only so that it will not change when memory-mapped for sharing.

Referring to FIGS. 2 and 3, in executing code, the execution manager 218 may find a reference (e.g., an HTTP or other reference) that refers to source code in a document (e.g., an HTML, XML, word processing, or other document) the execution manager 218 is parsing. The execution manager 218 may first check to see if the current version of the bytecode corresponding to the reference resides in the cache by consulting the data structure 305. If the bytecode resides in the cache, the execution manager 218 may obtain the bytecode for execution. If the bytecode does not reside in the cache, the execution manager 218 may obtain the source code from the source code location and may cause the source code to be compiled and executed without delay (e.g., without waiting for the code generator 216 to complete any outstanding compilation requests found in a queue).

In one implementation, the bytecode for source code may reside in a parallel directory to the source code. For example, if the source code resides in C:\PackageName\SourceCode\sourcecodename.scriptfile, the bytecode, if it exists, may reside in C:\PackageName\SomeName\bytecodename.bytecodefile.

In another implementation, the source code may reside on a remote device.

Figure 4:
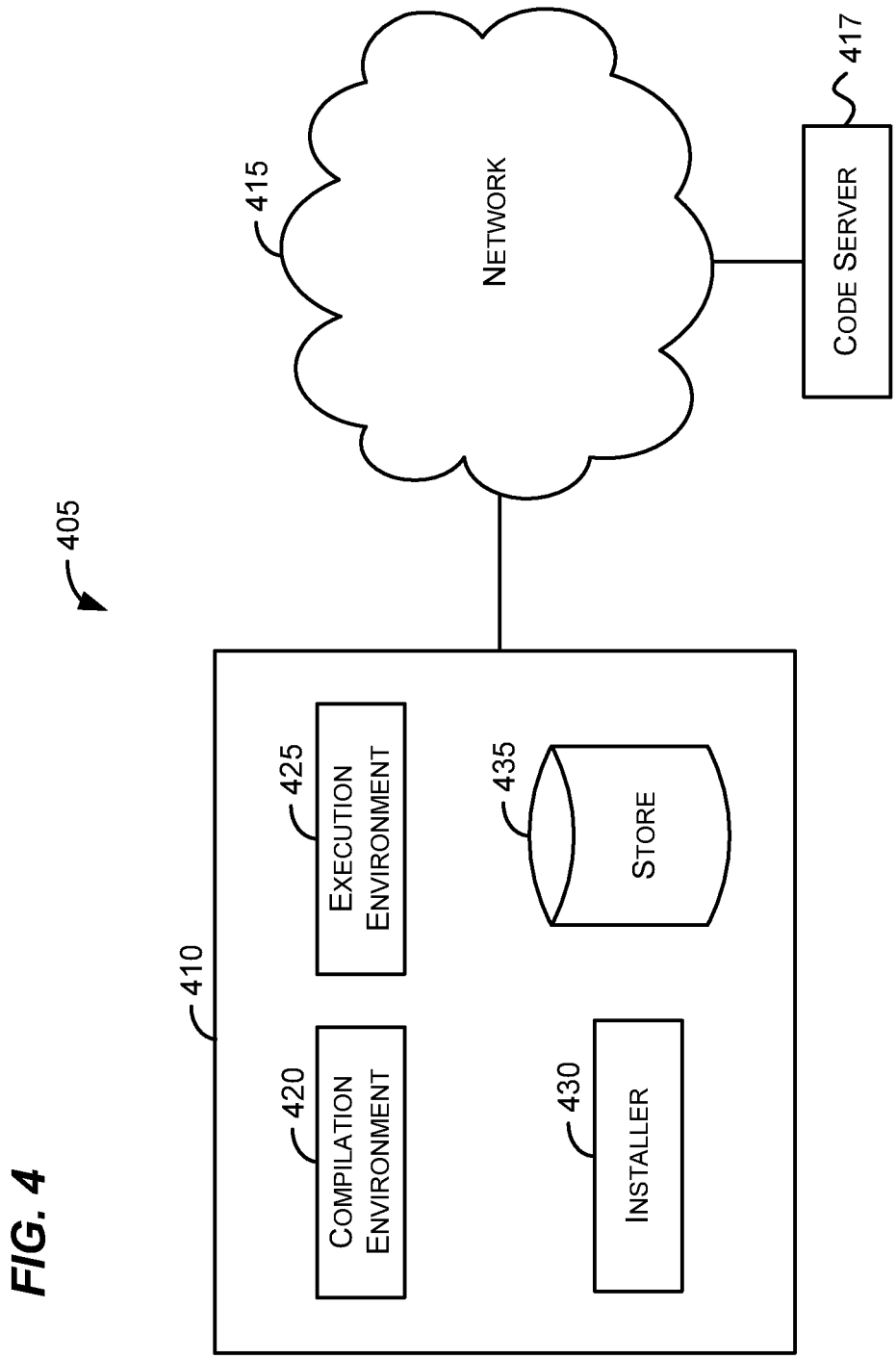
FIG. 4 is a block diagram representing an exemplary arrangement of components of an environment in which aspects of the subject matter described herein may operate.

FIG. 4 is a block diagram representing an exemplary arrangement of components of an environment in which aspects of the subject matter described herein may operate.

The components illustrated in FIG. 4 are exemplary and are not meant to be all-inclusive of components that may be needed or included. In other embodiments, the components and/or functions described in conjunction with FIG. 4 may be included in other components (shown or not shown) or placed in subcomponents without departing from the spirit or scope of aspects of the subject matter described herein. In some embodiments, the components and/or functions described in conjunction with FIG. 4 may be distributed across multiple devices.

Turning to FIG. 4, the environment 405 may include a target device 410, a network 415, a code server 417, and other components (not shown). The target device 410 and the code server 417 may comprise one or more computing devices. Such devices may include, for example, personal computers, server computers, hand-held or laptop devices, multiprocessor systems, microcontroller-based systems, set-top boxes, televisions, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as the target device 410 or the code server 417 comprises the computer 110 of FIG. 1.

In an embodiment, the network 415 may comprise the Internet. In an embodiment, the network 415 may comprise one or more local area networks, wide area networks, direct connections, virtual connections, private networks, virtual private networks, some combination of the above, and the like.

The code server 417 may provide code to the target device 410. In one embodiment, the code server 417 may be a Web server. In another embodiment, the code server 417 may be a machine internal to an organization's private network that includes code thereon. In other embodiments, the code server 417 may include any device capable of providing source code to the target device 410.

The target device 410 is a device upon which the code may execute. The target device 410 may include a compilation environment 420, and execution environment 425, an installer 430, and a store 435. The installer 430 may be implemented and act similarly to the installer 215 of FIG. 2 while the store 435 may be implemented and act similarly to the store 220 of FIG. 2.

The compilation environment 420 may comprise a restricted-rights environment in which source code may be compiled into bytecode. In one embodiment, the compilation environment 420 may comprise a virtual environment as described above. In another embodiment, the compilation environment 420 may comprise a different restricted-rights environment as has been described previously.

The execution environment 425 may comprise an environment in which software of a package is executed. In one implementation the execution environment 425 may comprise an Internet browser. In another implementation, the execution environment 425 may comprise a host process that is capable of executing software of a package that may include source code.

Figure 5:
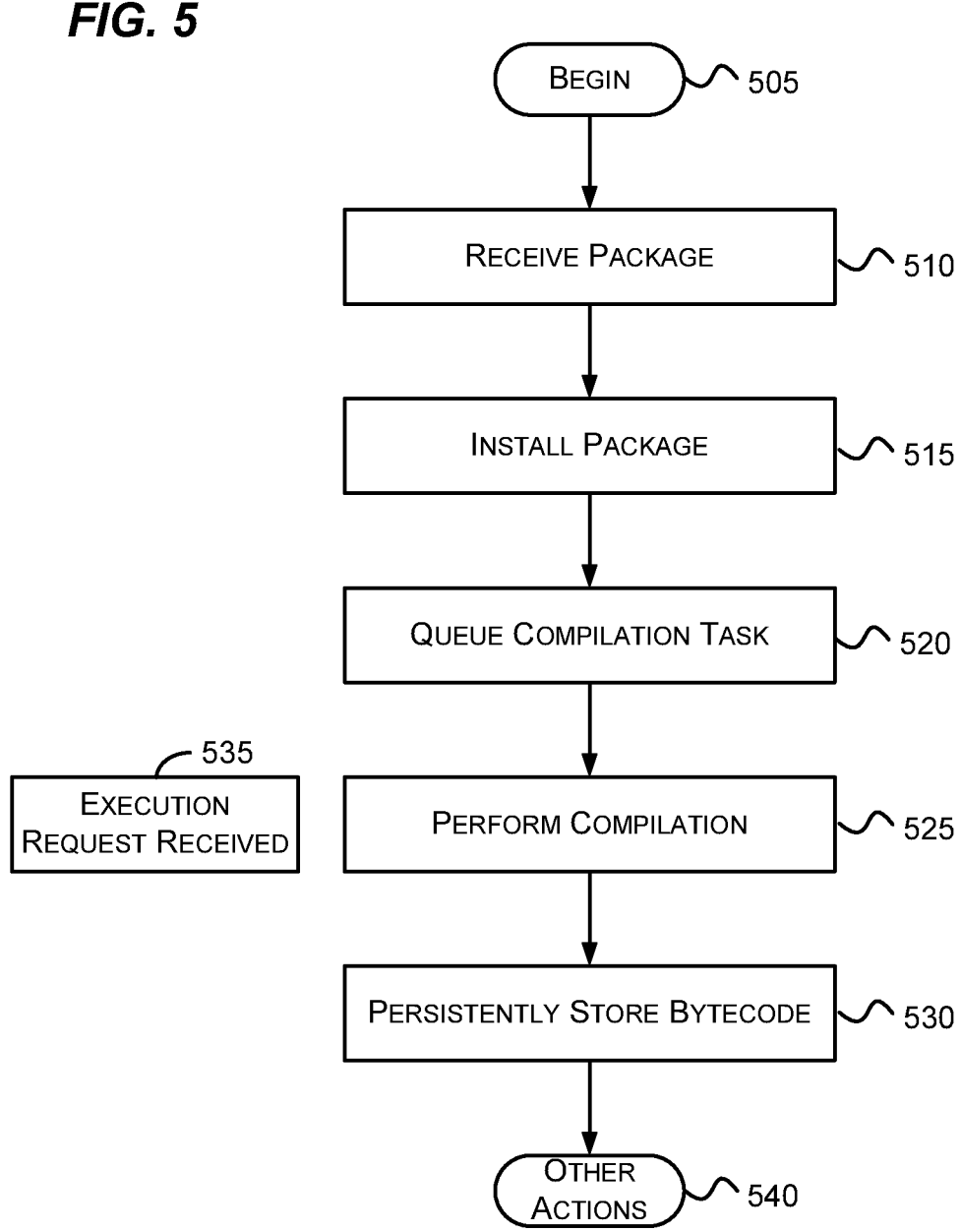
FIGS. 5-6 are flow diagrams that generally represent exemplary actions that may occur in accordance with aspects of the subject matter described herein.
Figure 6:
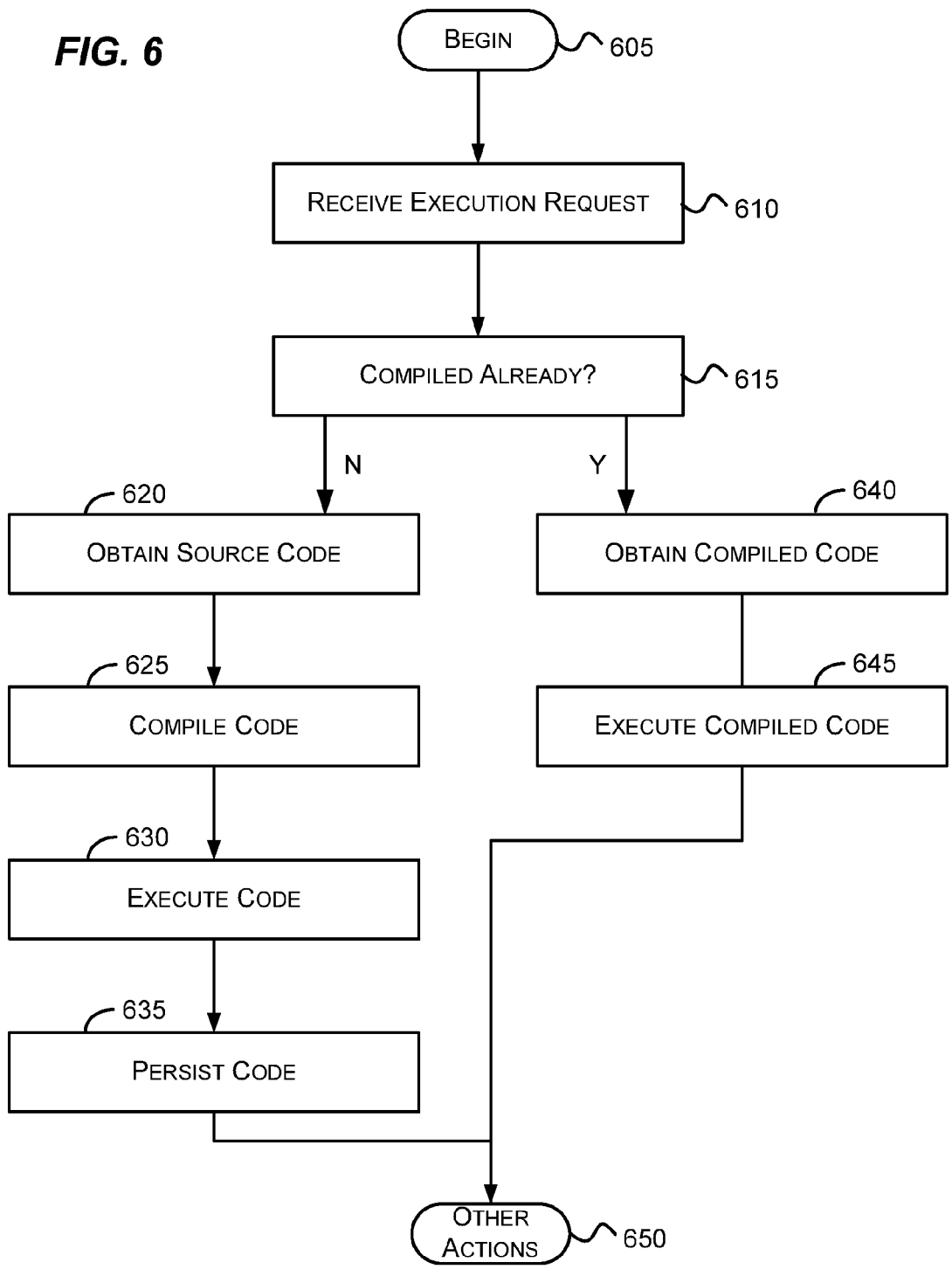

FIGS. 5-6 are flow diagrams that generally represent exemplary actions that may occur in accordance with aspects of the subject matter described herein. For simplicity of explanation, the methodology described in conjunction with FIGS. 5-6 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 5, at block 505, the actions begin.

At block 510, a package is received that includes source code of software to install on a target device. For example, referring to FIG. 4, the target device 410 may obtain a package from the code server 417. As another example, the installer 430 may be instructed to install a package that exists on the store 435.

At block 515, the package is installed on the target device. For example, referring to FIG. 2, the installer 215 may install the package on the store 220.

At block 520, an indicator is placed in a data structure such as a queue or the like. The data indicator indicates that the source code of the package is to be compiled into bytecode. There may be a separate indicator placed in the data structure for each file of source code in the package. For example, referring to FIG. 2, the installer 215 may place one or more flags in a data structure stored in the store 220.

At block 525, actions to initially compile the source code are performed unless a request to execute the software of the package is received before starting or completing the actions. These actions to compile the source code may include, for example:

1. Iterating through the data structure and finding indicator(s) that indicate that compilation is needed;

2. Compiling each applicable source code element found in step 1 above into bytecode or some other code;

For example, referring to FIG. 2, the code generator 216 may iterate through the data structure and compile source code files for flags found within the data structure. As another example, the code generator 216 may iterate through a list of files and compile any file that has a given extension (e.g., ".js" or another extension indicating a source file).

At block 530, the compiled code may then be persisted in nonvolatile memory. For example, referring to FIG. 2, the cache manager 217 may store the code generated by the code generator 216 in the store 220. The code may also be stored in volatile memory such as an in-memory cache or RAM to provide for quick loading and execution.

Block 535 is placed at the side of the actions 520-530 to indicate that a request to execute the software of the package may occur before, during, or after those actions. If such a request is received, other actions may be performed prior to starting or completing the actions of 520-530. For example, if such a request is received prior to starting or completing the actions of blocks 520-530, the source code may be compiled and executed on an expedited basis. Other actions describing what may occur if such a request is received are described in conjunction with FIG. 6.

At block 540, other actions, if any, may be performed. For example, a regeneration triggering event may be received. In response, the actions of block 520-530 may be re-performed potentially with different source code (if the source code has changed) and different second code compiled from the different source code.

Turning to FIG. 6, at block 605, the actions begin.

At block 610, a request to execute software that includes source code is received. For example, referring to FIG. 2, the execution manager 218 receives a request to execute software of a package installed on the store 220.

At block 615, a determination is made as to whether the code has already been compiled and stored on nonvolatile storage. If so, the actions continue at block 640; otherwise the actions continue at block 620. For example, referring to FIG. 2, the execution manager 218 utilizes the cache manager 217 to determine whether the package has already been compiled and stored on the store 220.

Determining whether the source code has already been compiled may include checking for the compiled code in known location of the nonvolatile storage. The known location may correspond to a name or other identifier of a package. For example, a known location may be a directory named after the package or a descendant directory of the directory. As another example, a known location may be a location referred to in a data structure that indicates where compiled code, if it exists, is located for the code. As another example, a known location may be a location derived from a reference that identifies a source location (e.g., a code server) of the source code where the source location is reachable over a network. As yet another example, determining whether the source code has already been compiled may involve checking a data structure stored in a file that collocates bytecode for the package with source code for the package. The data structure may indicate whether the second code has already been generated and is stored in file.

At block 620, the source code is obtained. For example, referring to FIG. 2, the code generator 216 obtains the source code from the store 220.

At block 625, the bytecode (or other code) is generated from the source code. For example, referring to FIG. 2, the code generator 216 creates bytecode, machine-executable code, or some other intermediate code from the source code obtained above.

At block 630, the code (or code derived therefrom such as executable code or other intermediate code) is executed. For example, referring to FIG. 2, the execution manager 218 executes the code generated above.

At block 635, the code is persisted to nonvolatile storage. The actions represented by block 635 may occur in conjunction with the actions above or be performed at a later period. For example, referring to FIGS. 2 and 3, the code generator 216 may utilize the cache manager 217 to collocate code for a package in the data structure 305 and store that data structure 305 on the store 220 for use in subsequent execution of the software. As another example, at a later time, the code generator 216 may re-obtain the source code and re-generate compiled code and store that compiled code on the store 220.

At block 640, if the code has already been compiled, the compiled code is obtained. For example, referring to FIG. 2, the execution manager 218 may obtain bytecode from the cache manager 217.

At block 645, the obtained code (or code derived therefrom such as binary code) is executed. For example, referring to FIG. 4, the code may be executed in the execution environment 425.

At block 650, other actions, if any, may be performed. For example, a file that includes the bytecode may be memory mapped and shared, via the memory mapping, with a plurality of processes.

As another example, other actions may include checking whether the compiled code was modified after being generated and if so re-obtaining the source code (which may be different than the original source code), re-compiling the source code, and storing the compiled code in the nonvolatile storage for use in subsequent execution of the software.

As can be seen from the foregoing detailed description, aspects have been described related to generating and caching software code. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
   receiving a request to execute software that includes source code, the source code comprises script code;
   in response to the request, determining whether second code has already been generated from the source code and stored in local storage;
   placing an indicator in a data structure after determining that the second code has already been generated and stored in the local storage and iteratively finding the indicator within the data structure;
   performing a first set of actions after determining that the second code has already been generated and stored in the local storage, the first set of actions comprising:
   obtaining the second code; and
   executing the second code or code derived therefrom;
   performing a second set of actions after determining that the second code has not been generated and stored in the local storage, the second set of actions comprising:
   obtaining the source code;
   generating the second code or code equivalent to the second code from the source code; and
   executing the second code or code derived therefrom or the code equivalent to the second code or code derived therefrom;
   performing a third set of actions after determining that the second code was modified after being generated, the third set of actions comprising:
   re-generating the second code or the code equivalent to the second code from re-obtained source code; and
   using the re-generated second code or the code equivalent to the second code in subsequent execution of the software; and
   memory mapping the second code to share the second code with a plurality of processes.

2. A system comprising:
   memory to store code, the memory including local storage;
   a processing unit configured to execute the code to:
   receive a request to execute software that includes source code, the source code comprises script code;
   in response to the request, determine whether second code has already been generated from the source code and stored in the local storage;
   place an indicator in a data structure after determining that the second code has already been generated and stored in the local storage and iteratively finding the indicator within the data structure;
   after determining that the second code has already been generated and stored in the local storage:
   obtain the second code; and execute the second code or code derived therefrom;
after determining that the second code has not been generated and stored in the local storage:
  obtain the source code;
  generate the second code or code equivalent to the second code from the source code; and
  execute the second code or code derived therefrom or the code equivalent to the second code or code derived therefrom;
after determining that the second code was modified after being generated:
  re-generate the second code or the code equivalent to the second code from re-obtained source code; and
  use the re-generated second code or the code equivalent to the second code in subsequent execution of the software; and
memory map the second code to share the second code with a plurality of processes.

\* \* \* \* \*